3,128,258
FOAMABLE COMPOSITION COMPRISING A HALO-METHYLATED DIAROMATIC ETHER, AN ORGANIC SOLVENT, AND A FINELY DIVIDED SOLID SALT OF CARBONIC ACID; PROCESS OF FOAMING SAME; AND FOAMED PRODUCT
James D. Doedens, Midland, and Earl H. Rosenbrock, Auburn, Mich., assignors to The Dow Chemical Company, Midland, Mich., a corporation of Delaware
No Drawing. Filed Mar. 29, 1961, Ser. No. 99,074
5 Claims. (Cl. 260—2.5)

The present invention concerns improved solid plastic foams prepared from halomethylated diaromatic ether compositions. More particularly, the invention involves incorporating into such compositions minor proportions of an essentially non-aromatic, organic solvent, a salt of carbonic acid or a mixture of the essentially non-aromatic, organic solvent and a finely divided, solid especially in the latter instance, a finely divided salt of carbonic acid. Such agents improve one or more physical characteristics of the resulting foam product such as the foam strength, density or pore size and uniformity.

It is known that certain halomethylated diaromatic ether compositions undergo condensation reactions under suitable thermal conditions, with or without the presence of a catalyst for the reaction, to provide solid foams. See, for example, Doedens, United States Letters Patent No. 2,911,380. In particular, the reference teaches that one or more chloromethylated or bromomethylated diaromatic ethers are condensed in the presence of a small quantity of a Friedel-Crafts catalyst at a temperature within a range of from at least about 90° C. up to the decomposition temperature of the resulting resin to provide solid thermoset foam bodies. Foams thus prepared are often characterized by uneven pore structures comprising relatively large cells which may be disrupted with large blow holes. Foams having such cell structures exhibit low strength characteristics.

In our copending United States patent application Serial No. 842,608, filed September 28, 1959, now U.S. Patent No. 3,000,839, there is disclosed an improved catalyst system for preparing the aforementioned foams. While the employment of the improved catalyst, i.e., ferrous or ferric phosphates, achieves a highly desirable and substantial improvement in the resulting solid foam as regards its pore size and shrinkage during curing, there still remain large margins in these respects as well as in the area of foam strength characteristics for additional improvement.

The principal object of the present invention is to provide novel, improved condensation foam products of halomethylated diaromatic ethers. Another object is to provide such foams characterized by smaller and more uniform cell structures. A further object is to provide such foams having lower density and higher strength characteristics. A still further object is to provide a novel method for preparing the improved foams. Other objects and benefits will become manifest hereinafter as the invention is more fully described.

In accordance with the present invention, it has been discovered that solid foams prepared from foaming halomethylated diaromatic ether compositions are substantially improved in accordance with the present invention by incorporating into the foaming composition at least about 0.1 percent and up to about 4.0 percent, preferably from about 0.25 to about 2.0 percent by weight of the foaming composition of an essentially non-aromatic, organic solvent material having a boiling point above and a melting point below the temperature employed to cause the foaming compositions to undergo condensation whereby solid foams are produced. Usually, this temperature varies from as little as about 60° C., when highly effective catalysts for the reaction are used, up to as much as 135° C. or more for less effective catalysts. While the preferred temperature is just sufficient to cause the foaming reaction to occur, higher temperatures up to the decomposition temperature of the foam products, e.g., about 400° C., can be employed.

What is more, it has been discovered that the above-described objects are even better fulfilled if the organic solvent is added to the foaming composition conjunctively with a finely divided solid material. By "finely divided" is meant consisting of particles whose major dimension is less than about 0.01 inch. Best results are obtained when these additives are used in the form of an admixture. Such a modification is most advantageous if the finely divided, solid material employed is a salt of carbonic acid such as alkali metal, alkaline earth metal and ammonium carbonates or bicarbonates. In fact, the latter finely divided solid materials are unique in that they may be employed alone, i.e., without the presence of the aforementioned organic solvent, to achieve highly beneficial modification of the solid foams.

The essentially non-aromatic, organic solvents that can be employed in the present invention include liquid saturated and unsaturated, aliphatic and alicyclic hydrocarbons and halogenated derivatives thereof, which organic materials have a boiling point above and a melting point below the temperature employed in the foaming reaction. They are essentially free of such substituent functional groups as hydroxy, carboxy, amine, acyl and the like functional groups. Specific examples are heptane, octane, nonane, decane, dodecane and the like alkanes containing up to as many as 40 to 50 carbon atoms; halogenated aliphatic hydrocarbons such as amyl chloride, butylene chloride and higher chlorinated paraffins; alicyclic hydrocarbons such as cycloheptane, cyclooctane and higher cycloalkanes and other compositions composed essentially of paraffins such as mineral oil, motor oil, ligroin and the like. Also operable are the essentially aliphatic, long chain, naturally occurring oils and waxes such as linseed oil, soy bean oil and the like.

Finely divided solids that may be employed include inert solids such as silica, diatomaceous earth, magnesium silicate, calcium (talc) silicate and the like. Also operable are such basic solids as calcium oxide, magnesium oxide and the like. The finely divided solid carbonates, which are uniquely efficacious, include, for example, lithium, sodium, potassium, cesium and ammonium carbonates and bicarbonates and calcium, magnesium and barium carbonates. The amount of a particular finely divided solid employed, with or without the presence of an organic solvent in the instance of the bicarbonates and carbonates, can vary from as little as about 0.1 to as much as about 4.0 percent, preferably about 1.5 percent by weight of the foaming composition.

Halomethylated diaromatic ethers operable in the present invention have the general formula

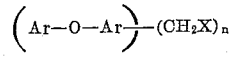

wherein Ar is an aromatic radical having at least one hydrogen atom subject to displacement by a halomethyl group in a halomethylation reaction, X is selected from the group consisting of chlorine and bromine and $n$ is an integer from 1 to 4, inclusive. The above formula is also to be understood as including unsymmetrical as well as symmetrical diaromatic ethers. The average value of $n$ for a mixture of such polyhalomethyl diaromatic ethers is termed the "halomethyl functionality" of the mixture.

Halomethyl diaromatic ethers than can be employed in the present invention include mono(chloromethyl)diphenyloxide, di(chloromethyl)diphenyloxide, tri(chloromethyl)diphenyloxide, tetra(chloromethyl)diphenyloxide, mono(bromomethyl)diphenyloxide, di(bromomethyl)diphenyloxide, tri(bromomethyl)diphenyloxide, tri(chloromethyl)-para-di(chlorophenyl)oxide, di(chloromethyl)-para-ditolyl ether and the like compounds as well as mixtures of two or more of such ethers.

The above mono- and poly(halomethyl) diaromatic ether compounds are prepared by known halomethylation procedures. The usual halomethylation reaction provides, as the initial reaction product, a mixture of the various halomethyl diaromatic ether derivatives that are possible. For example, in a typical chloromethylation reaction of diphenyloxide employing formaldehyde, hydrogen chloride and a Friedel-Crafts catalyst such as zinc chloride, aluminum chloride, ferric chloride or boron trifluoride, a mixed reaction product is obtained, which depending upon the extent to which the reaction is carried out and the type and amount of catalyst used, consists of a number of different chloromethyl derivatives of diphenyloxide and the position isomers thereof. Component schedules of four such products are set forth in the following Table 1. A convenient designation of a particular reaction product mixture is the weight percent of chlorine in that mixture.

TABLE 1

| Component | Halomethylated Diaromatic Ether Composition Classified According to Chlorine Content | | | |
|---|---|---|---|---|
| | 17.6% Cl | 23.6% Cl | 25.2% Cl | 30.7% Cl |
| | Mole Percent | | | |
| Diphenyl ether DPO | 17.3 | 0.0 | 0.0 | 0.0 |
| o-Monochloromethyl DPO | 5.3 | 0.5 | 0.25 | 0.0 |
| p-Monochloromethyl DPO | 42.9 | 4.7 | 2.35 | 0.04 |
| o,p'-Dichloromethyl DPO | 10.8 | 35.4 | 17.7 | 1.9 |
| p,p'-Dichloromethyl DPO | 20.6 | 37.7 | 69.5 | 8.6 |
| Trichloromethyl DPO | 2.3 | 21.1 | 10.5 | 89.0 |
| Tetrachloromethyl DPO | 0.5–1.0 | 0.5–1.0 | 0.5 | |

While a catalyst is not necessary for operability, i.e., heat alone at higher temperatures is sufficient to cause foaming, it is preferred to employ one in order to promote the foam-forming reaction rate. Friedel-Crafts catalysts, even when employed in very small proportions and/or in a form deactivated by contact with water or with aqueous solutions of acids, bases or salts, are highly effective in catalyzing the condensation reaction and in causing a lowering of the temperature at which it can be achieved. Friedel-Crafts catalysts, such as those previously mentioned in connection with the preparation of the halomethyl diaromatic ethers, are operable, but the catalyst set forth in our copending application mentioned above, viz., ferric and ferrous phosphates, are preferred.

Either continuous or batch process techniques may be employed to prepare the foams of the invention. For example, small but effective quantities of a suitable organic solvent, a suitable organic solvent and a finely divided solid or finely divided carbonates are mixed into a halomethylated diaromatic ether composition in a manner so as to achieve a homogeneous composition. Subsequently, a catalyst for the reaction such as a Friedel-Crafts catalyst is added to the composition. The foaming reaction is initiated upon the application of heat to the catalyzed composition above a temperature of at least about 60° C. Generally, the temperature employed is within the range from about 100° C. to about 135° C. The heating may be carried out simultaneously with the mixing of the reaction ingredients or at a subsequent time within the shelf life of the reaction mixture. In the presence of the catalyst, the shelf life of the reaction mixture may vary from a few hours to several days or weeks depending upon the amount and type of catalyst present and storage temperature conditions.

Another method that can be employed to prepare the modified foams of the present invention is that disclosed in our copending application Serial No. 47,428, filed August 4, 1960, now U.S. Patent No. 3,075,929. In this method, the foaming composition may be divided into two streams. A catalyst for the reaction is incorporated into one stream. The other stream is brought to a temperature sufficient to provide the required heat for the reaction. The two streams are then mixed whereupon the resulting composition is caused to foam.

The following examples are illustrative of the present invention and are not to be construed as limitations thereof.

*Examples 1–13*

Foamable compositions were prepared comprising a catalyst for the foaming reaction and a poly-(chloromethyl)-diphenyloxide composition, hereinafter designated CMDPO–17, which consisted of about 17.3 percent diphenyloxide, 48.2 percent mono(chloromethyl)diphenyloxide, 31.4 percent di(chloromethyl)diphenyloxide, 2.3 percent tri(chloromethyl)diphenyloxide and about 0.5 percent tetra(chloromethyl)diphenyloxide. One such composition was employed to prepare a "control" foam and others were various modified in accordance with the present invention. The particular ingredients and amounts thereof employed are detailed in the following Table 2. Each modifying ingredient was thoroughly mixed into the CMDPO–17 before the addition of the catalyst. Foamable compositions thus prepared, except for those designated as Examples 12 and 13, were then caused to foam in a 1 quart paper cup with application of heat from an infrared lamp. Examples 12 and 13 were placed in an evaporating dish and foamed on a hot plate maintained at 100° C.

The resulting rigid foams were then subjected to tests to determine their density and compressive strength. Compressive strength measurements were made by directly applying a gradually increasing force to a 1 inch square metal plate placed on a horizontal, flat foam surface. The foam strength was taken as that force which was being applied at the yield point of the foam. The yield point was determined by the occurrence of a definite rupture in the cellular material as indicated by a pronounced penetration of the metal plate into the foam. The compressive strength value was taken as an average of six determinations made in the foregoing manner. The foam density was determined in a conventional manner.

Also measured were characteristics of cell structure designated as average cell size and numbers of blow holes, the latter being irregular, oversized cells in an otherwise essentially uniform structure. The average cell size was determined by direct microscopic examination of a small shaving of foam product. The number of blow holes was obtained by counting the number of oversized holes in a circular piece of foam product 4.5 inches in diameter. The blow holes were classified according to the specified diameter ranges. The results obtained are reported in the following Table 2.

Additional foamable compositions were prepared from the poly-(halomethyl) diaromatic ether composition employed in Examples 1–13 and a small but effective quantity of 1, 2 and 3 percent by weight each of finely divided sodium carbonate, sodium bicarbonate and calcium carbonate. A catalytic amount, i.e., about 1 percent, of ferrous phosphate was added to each of these compositions. The resulting foamable composition was caused to foam by heating at 125° C. The rigid foams thus prepared all had smaller and more regular pores than foams prepared from unmodified poly-(halomethyl) diaromatic

TABLE 2

| Example | CMDPO-17 Percent | Additive Percent | Additive Composition | Catalyst Percent | Catalyst Type | Density, lbs./ft.³ | Compressive Str., lbs./in.² | Average Cell Size (mm.) | Number Blow Holes 0.8 mm.–1.6 mm. | Number Blow Holes 1.6 mm.–3.2 mm. |
|---|---|---|---|---|---|---|---|---|---|---|
| 1 | 99.5 | | Control | 0.5 | $Fe_3(PO_4)_2$ | 1.35 | 5 | 0.8 | (¹) | (¹) |
| 2 | 97.5 | 2 | M.O.² | 0.5 | $Fe_3(PO_4)_2$ | 1.09 | 6 | 0.5 | 20 | 15 |
| 3 | 96.5 | 3 | 1/1:M.O.²/$CaCO_3$ | 0.5 | $Fe_3(PO_4)_2$ | 0.57 | 9 | 0.25 | 5 | 1 |
| 4 | 96.5 | 3 | 2/1:M.O.²/$CaCO_3$ | 0.5 | $Fe_3(PO_4)_2$ | 0.76 | 8 | 0.3 | 4 | 2 |
| 5 | 96.5 | 3 | 2/1:M.O.²/$NaHCO_3$ | 0.5 | $Fe_3(PO_4)_2$ | 0.65 | 8.5 | 0.4 | 2 | 6 |
| 6 | 96.5 | 3 | 2/1:M.O.²/$K_2CO_3$ | 0.5 | $Fe_3(PO_4)_2$ | 0.71 | 8 | 0.3 | 10 | 2 |
| 7 | 96.5 | 3 | 2/1:linseed oil/$CaCO_3$ | 0.5 | $Fe_3(PO_4)_2$ | 0.86 | 6.5 | 0.45 | 35 | 25 |
| 8 | 96.5 | 3 | 2.1:C.P.³/$CaCO_3$ | 0.5 | $Fe_3(PO_4)_2$ | 0.5 | 6 | 0.5 | 42 | 42 |
| 9 | 96.5 | 3 | 2/1:M.O.²/silene | 0.5 | $Fe_3(PO_4)_2$ | 1.31 | 6.8 | 0.25 | 13 | 20 |
| 10 | 96.5 | 3 | 2/1:M.O.²/talc | 0.5 | $Fe_3(PO_4)_2$ | 1.2 | 7 | 0.4 | 61 | 18 |
| 11 | 96.5 | 3 | 2/1:M.O.²/diatomaceous earth. | 0.5 | $Fe_3(PO_4)_2$ | 0.95 | 7 | 0.5 | 40 | 15 |
| 12 | 96 | 3 | 1/1:M.O.²/$CaCO_3$ | 1 | $FeCl_3^4$ | 0.6 | 4.5 | 0.25 | (⁵) | (⁵) |
| 13 | 96 | 3 | 1/1:M.O.²/$CaCO_3$ | 1 | $AlCl_3^4$ | 0.7 | 5.5 | 0.2 | (⁵) | (⁵) |

¹ Too many for measurement.
² Mineral oil.
³ A chlorinated paraffin containing 42 percent by weight chlorine.
⁴ A 50 percent solution in methanol.
⁵ No measurements made.

ether compositions. Optimum results were obtained with about 2 percent by weight of the carbonates.

In a manner similar to that of the foregoing examples, other aliphatic and alicyclic hydrocarbons having a boiling point above about 60° C. and a melting point below at least about 90° C., including halogenated and unsaturated derivatives thereof can be substituted for the mineral oil employed above to achieve comparable results in improving the strength and pore characteristics of the resulting foamed bodies. Similarly, other poly-(halomethyl) diaromatic ethers such as di-, tri- and tetra(chloromethyl) diphenyloxide and mixtures thereof such as those illustrated in Table 1 containing 23.6, 25.2 and 30.7 percent combined chlorine can be substituted for the CMDPO-17 employed in the foregoing examples to achieve similar results.

What is claimed is:

1. A thermally, foamable composition of matter comprising a halomethylated diaromatic ether of the benzene series having an average halomethyl functionality of at least about 1 and up to about 4 per molecule, wherein the halogens are selected from the group consisting of chlorine and bromine, and from about 0.1 to about 4 percent by weight, based on the weight of the halomethylated diaromatic ether, of each of (1) an organic solvent composed essentially of paraffins having from 7 to 50 carbon atoms and a boiling point above and a melting point below a temperature sufficient to cause the halomethylated diaromatic ether composition to foam and (2) a finely divided solid salt of carbonic acid selected from the group consisting of alkali metal and ammonium carbonates and bicarbonates and alkaline earth metal carbonates.

2. A thermally, foamable composition of matter comprising a halomethylated diaromatic ether selected from the group consisting of chloromethylated diphenyloxide and bromomethylated diphenyloxide compositions having an average halomethyl functionality of at least about 1 and up to about 4 per molecule and from about 0.1 to about 4 percent by weight, based on the weight of the halomethylated diaromatic ether, of each of (1) an organic solvent consisting essentially of paraffins having from 7 to 50 carbons and a boiling point above and a melting point below a temperature sufficient to cause the halomethylated diaromatic ether composition to foam and (2) a finely divided solid salt of carbonic acid selected from the group consisting of alkali metal and ammonium carbonate and bicarbonates and alkaline earth metal carbonates.

3. A solid, thermoset foam product which comprises the thermal condensation reaction product of a halomethylated diaromatic ether of the benzene series having an average halomethyl functionality of at least about 1 and up to about 4 per molecule, wherein the halogens are selected from the group consisting of chlorine and bromine, which solid foam has uniformly incorporated therein from about 0.1 to about 4 percent by weight, based on the weight of the halomethylated diaromatic ether composition, of each of (1) an organic solvent consisting essentially of paraffins having from 7 to 50 carbons and a boiling point above and a melting point below a temperature sufficient to cause the condensation reaction of the halomthylated diaromatic ether and (2) a finely divided solid salt of carbonic acid selected from the group consisting of alkali metal and ammonium carbonates and alkaline earth metal carbonates.

4. In a method for preparing improved condensation foams of halomethylated diaromatic ethers of the benzene series having an average halomethyl functionality of at least about 1 and up to about 4 per aromatic molecule, wherein the halogens are selected from the group consisting of chlorine and bromine, which method comprises the steps of adding a Friedel-Crafts catalyst to the halomethylated diaromatic ether composition and heating the resulting composition at a suitable temperature to cause a condensation reaction whereby a solid foam is produced, the improvement which consists in adding to the composition prior to the heating step, from about 0.1 to about 4 percent by weight, based on the weight of the halomethylated diaromatic ether, of each of (1) an organic solvent consisting essentially of paraffins having from 7 to 50 carbons and a boiling point above and a melting point below the foaming reaction temperature of the halomethylated diaromatic ether and (2) a finely divided salt of carbonic acid selected from the group consisting of alkali metal and ammonium carbonates and bicarbonates and alkaline earth metal carbonates.

5. The method as in claim 4 wherein the organic solvent and the finely divided solid metal salt of carbonic acid are added to the halomethylated diaromatic ethers in the form of an admixture.

References Cited in the file of this patent

UNITED STATES PATENTS

| | | |
|---|---|---|
| 2,684,341 | Anspon et al. | July 20, 1954 |
| 2,864,777 | Greenhoe | Dec. 16, 1958 |
| 2,911,380 | Doedens | Nov. 3, 1959 |
| 2,966,471 | Anspon | Dec. 27, 1960 |
| 3,000,839 | Rosenbrock et al. | Sept. 19, 1961 |
| 3,072,581 | Platzer | Jan. 8, 1963 |